United States Patent [19]
Strieker et al.

[11] Patent Number: 6,027,052
[45] Date of Patent: Feb. 22, 2000

[54] METHOD AND APPARATUS FOR EJECTING MATERIAL

[75] Inventors: Norbert Strieker, Gütersloh; Ludger Hugenroth, Ostbevern, both of Germany

[73] Assignee: Claas KGaA, Harsewinkel, Germany

[21] Appl. No.: 09/128,846

[22] Filed: Aug. 4, 1998

[30] Foreign Application Priority Data

Aug. 4, 1997 [DE] Germany .......................... 197 33 722

[51] Int. Cl.[7] .................................................. A01C 15/04
[52] U.S. Cl. ............................. 239/654; 239/7; 239/659; 239/665
[58] Field of Search ............................... 239/7, 4, 654, 239/659, 665

[56] References Cited

U.S. PATENT DOCUMENTS 4,763,844   8/1988   Van Der Lely et al. ................ 239/665
5,558,282   9/1996   Ameye et al. .............................. 241/60

FOREIGN PATENT DOCUMENTS

| 0 631 717 A1 | 5/1994 | European Pat. Off. ........ A01F 12/40 |
| 78126 | 12/1970 | Germany ......................... A01F 29/08 |
| 32 32 812 A1 | 3/1984 | Germany ......................... B65G 31/04 |
| 872604 | 7/1961 | United Kingdom ................... 239/659 |

*Primary Examiner*—Andres Kashnikow
*Assistant Examiner*—Robin O. Evans
*Attorney, Agent, or Firm*—Husch & Eppenberger, LLC; Robert E. Muir

[57] ABSTRACT

The invention concerns a method and an apparatus for ejecting a material, in particular a straw material, having a pivot unit comprising an impeller blower, a cooperating fluid cylinder, with a control unit comprising at least one directional control valve for control of the fluid cylinder so that at least one ejection nozzle of the impeller blower can be pivoted reciprocally. The control unit further comprises a pressure control valve. An electrical control device is provided, which acts on the pressure control valve and/or the directional control valve in such a way that a piston of the fluid cylinder essentially performs a harmonic reciprocating movement.

21 Claims, 4 Drawing Sheets

METHOD AND APPARATUS FOR EJECTING MATERIAL

BACKGROUND OF THE INVENTION

The present invention relates generally to agricultural machinery and, more particularly, to a method and an apparatus for ejecting a material from such machinery.

It is known from European Patent 0 631 717 A1 that a pivot unit with an impeller blower and a reciprocating fluid cylinder for pivoting the impeller blower can be provided for ejecting a material over a predetermined width.

It is also known that, directional control valves can be provided to drive the movement of a piston located in the fluid cylinder. The directional control valves act as a pressure medium by alternately opening and closing the fluid supply to connecting points arranged opposite to one another in an end region of the fluid cylinder. A storage device is provided to equalize pressure peaks at the turning points of the piston. The storage device is, however, subjected to high stress in case of high switching cycles.

It is therefore the object of the present invention to provide a method and an apparatus for ejecting a material, having a reliable and inexpensive means for driving a fluid cylinder.

SUMMARY OF THE INVENTION

In accordance with the present invention there is provided a method for ejecting a particulate material comprising the steps of: mounting an impeller blower for pivotal movement; reciprocating a fluid cylinder and causing the impeller blower to pivot back and forth; controlling the flow of fluid to the fluid cylinder during the pivot operation so there is a gradually increasing pressure on the fluid cylinder piston followed by a pressure drop before reversal of the fluid cylinder.

One advantage of the method according to the invention is that the electronic driving of the directional control valve causes a desired predetermined harmonic movement of the piston. As a result, the movement of the piston can be adapted variably to the respective requirements of pivot operation.

Advantageously the piston, starting from a valve switching time, is subjected to a gradually increasing drive pressure, thereby steadying the movement of the piston in the region of the turning point. Preferably the piston is subjected to a reduced drive pressure within a specific turning range.

According to a particular embodiment of the invention, the controlling valve is driven by means of an electronic pulse width control system, which causes a linear increase in the drive pressure, producing a non-jerky pivot movement.

According to another aspect of the invention there is provided an apparatus for ejecting a material including a pivot unit comprising an impeller blower having at least one ejection nozzle and a cooperating fluid cylinder which has a piston operatively connected to the impeller blower; a control unit comprising at least one directional control valve for control of the fluid cylinder, and so constructed and arranged that the ejection nozzle is pivoted reciprocally; the control unit comprising a pressure control valve and an electrical control device which acts on the pressure control valve and on the directional control valve in such a way that the piston of the fluid cylinder has a generally harmonic reciprocating movement.

Driving the pressure control valve allows a predetermined pressure curve to be set within the fluid cylinder, which ensures a harmonic movement cycle of the piston during pivot operation. Consequently, smooth pivot movement is obtained and the control unit is distinguished by a long life.

According to one feature of the invention, two 3/2-port directional control valves are connected to the fluid cylinder. These directional control valves are driven alternately to produce the reciprocating movement of the piston in the fluid cylinder. Furthermore, these directional control valves allow rapid switching without idle times.

The control unit advantageously comprises a hydraulic adjusting device with a hydraulic circuit, which comprises a pressure source and a tank, allowing reliable pivot operation. By driving the pressure control valve, the pressure in the fluid pipe can be varied as a function of standards of an electrical control device.

The electrical control device advantageously comprises means for resetting the switching times for the valves as a function of the actual conditions. This provides a learning system which reacts to altered state variables and maintains proper harmonic pivot operation.

BRIEF DESCRIPTION OF THE DRAWINGS

A practical example of the invention is described in more detail below with the aid of the drawings, in which.

DETAILED DESCRIPTION

An embodiment of the invention can be used wherever it is important to maintain uniform pivoting of a machine component. As an example, it can be used for a salt spreader for road traffic or, as described below, in a mounted chopper for a combine harvester.

Figure 1:
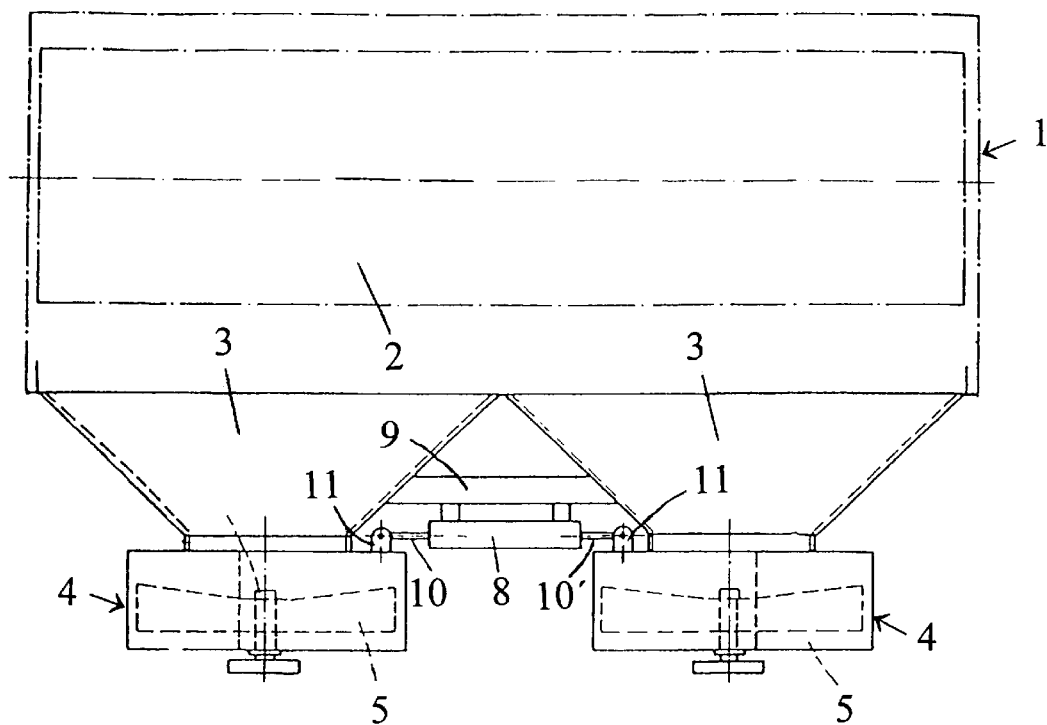
FIG. 1 is a schematic rear view of a mounted chopper with two pivotally mounted impeller blowers.
Figure 2:
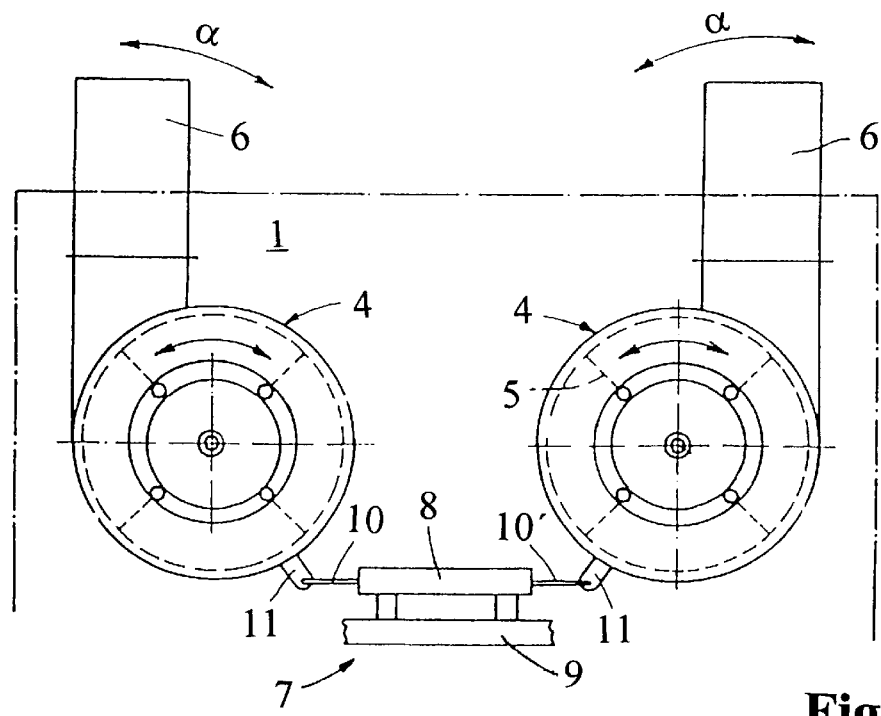
FIG. 2 is a top view of the two impeller blowers of FIG. 1.

As can be seen from FIG. 1 in conjunction with FIG. 2, a mounted chopper 1 comprises a straw chopper 2, with a transfer hopper 3, which is adjoined to the straw chopper's 2 underside and supplies the chopped straw in each case to an impeller blower 4. The impeller blower 4 comprises in each case a rotor 5 which supplies the straw material to an ejection nozzle 6 through which the straw material is ejected from the chopper 1. The two impeller blowers 4 are arranged parallel to each other and are connected together by means of a pivot unit 7. The ejection nozzles 6 are reciprocated in a sideways direction during operation of the pivot unit 7.

The pivot unit 7 includes a fluid cylinder 8 which is attached to a stationary support 9. The fluid cylinder 8 is constructed as a double-acting cylinder and comprises two piston rods 10, 10' on opposite sides of a piston 25. Each free end of the piston rods 10, 10' is linked, respectively, to a hinge point 11 of the impeller blower 4.

Figure 3:
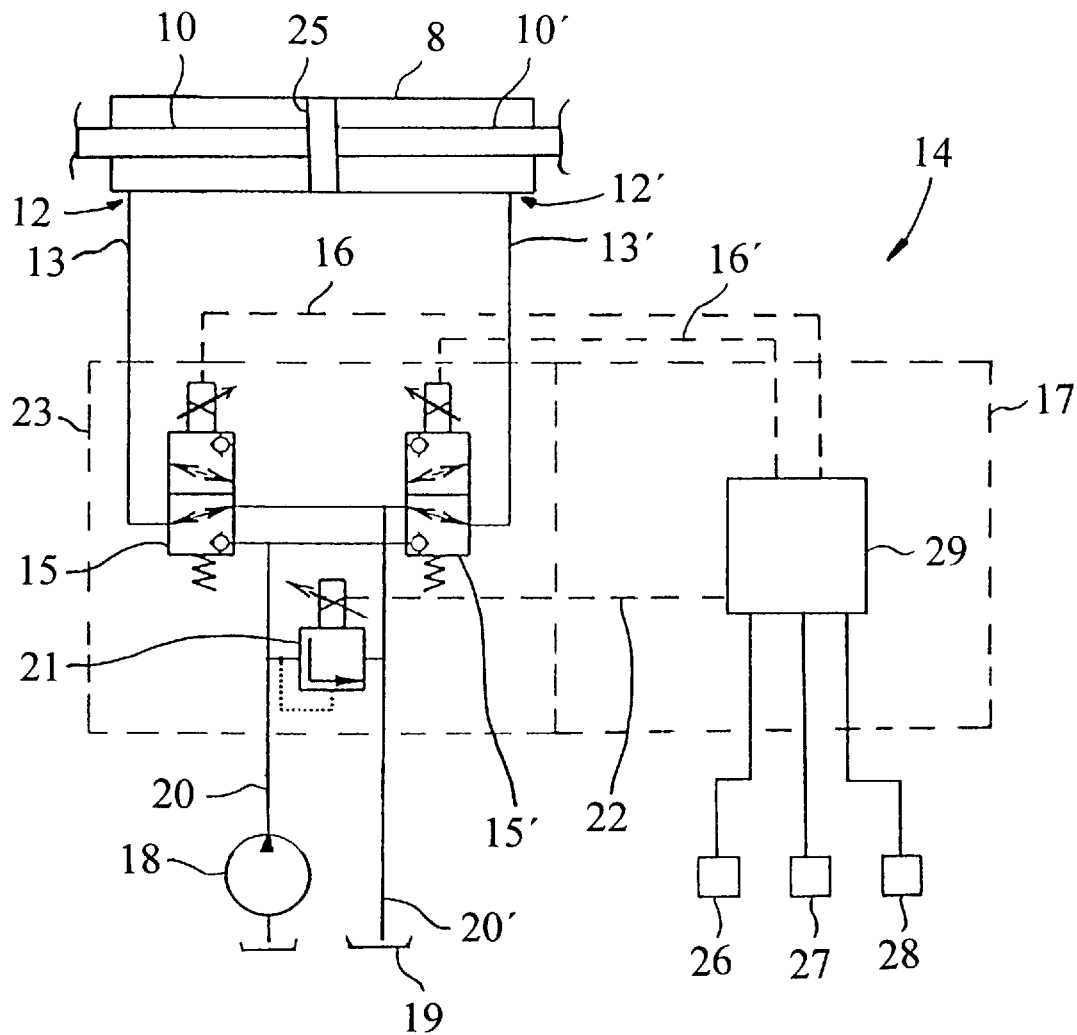
FIG. 3 is a diagram of a control unit for the pivot unit.

As illustrated in FIG. 3, fluid connections 12, 12' for connection of fluid pipes 13, 13' are provided in a region of the ends of the fluid cylinder 8. A control unit 14 controls the alternating action of fluid on the fluid connections 12, 12', so that the ejection nozzles 6 reciprocate uniformly through a predetermined pivot angle α. The control unit includes an electrical control device 17 and a hydraulic adjusting device 23, both described below. The fluid connections 12, 12' are each connected to a 3/2-port directional control valve 15, 15' which are constructed as seat valves. The 3/2-port directional control valves 15, 15' each have an electromagnet or solenoid, and are operated electrically via a control wire 16, 16'. The electrical control device 17 switches the directional control valves 15, 15' into open and closed positions respectively in such a way that the directional control valves 15, 15' are alternately connected to a pressure source 18 and a tank 19 by means of fluid pipes 20 or 20'. The pressure source 18 delivers a constant volume flow.

As becomes clear from FIG. 3, during pivot operation in a first switching position the fluid flows through the fluid pipe 13 as an input to one fluid connection 12 and as an output for the other connection 12' by means of the fluid pipe 13' to the other 3/2-port directional control valve 15'. In the second switching position of the directional control valves 15, 15', in which the piston 25 of the fluid cylinder 8 moves in the reverse direction, the fluid pipe 13' serves as the input while the fluid pipe 13 serves as the output.

An electrically operated pressure control valve 21 is arranged between the fluid pipes 20, 20'and is connected to the electrical control device 17 by a control wire 22. The pressure control valve 21 is constructed as a pressurelimiting valve. The valves described above 15, 15', 21, in conjunction with the pressure source 18 and the tank 19, form the hydraulic adjusting device 23 which cooperates with the electrical control device 17 to allow smooth pivot movement of the ejection nozzles 6.

Figure 4:
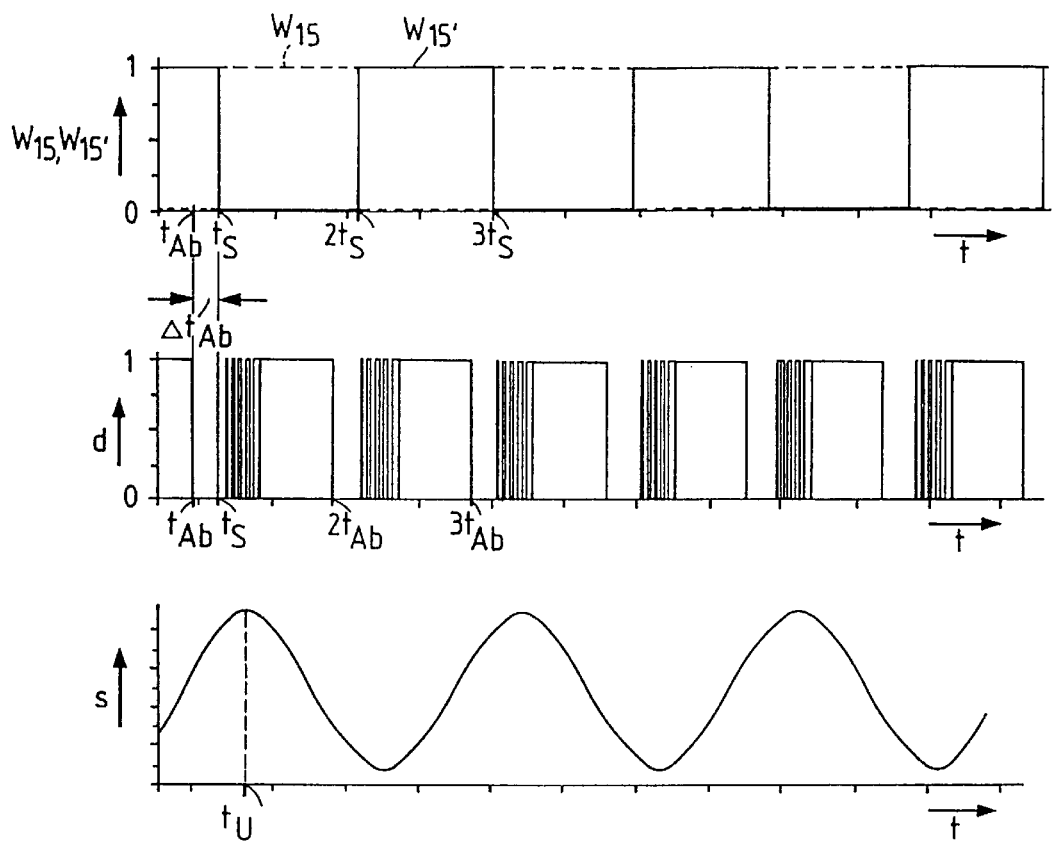
FIG. 4 is a time curve of valve switching states and of piston displacement of the fluid cylinder during pivot operation.

The s/t displacement-time graph of the piston 25 in FIG. 4 illustrates that a harmonic pivot movement is produced. For this purpose, directional control signals $w_{15}$, $w_{15}'$ are switched on and off alternately. The pressure control valve 21 is controlled by means of a pressure control signal d in the region of the turning point of the piston 25, reducing pressure or drive pressure in the fluid pipes 13, 13' or in the fluid cylinder 8. Advantageously, before reaching the switching time $t_S$ of the valves 15, 15', the pressure control valve 21 is driven to reduce pressure to a minimum. At the switching time $t_S$ of the valves 15, 15', the pressure is gradually increased to a maximum value by means of the pressure control valve 21. This pressure rise, which is linear on average, can be made possible by pulse width control, for example. The maximum pressure may be maintained up to a switch-off time $t_{Ab}$ of the pressure control valve 21, when the piston 25 has gone beyond its center position, producing a harmonic oscillating movement. At the switch-off time $t_{Ab}$ the pressure is suddenly reduced to a minimum value and maintained until the next switching time $t_S$. This switch-off time interval $\Delta t_{Ab}$ is sufficient before the turning switching time $t_u$ of the piston 25, thereby ensuring harmonic acceleration of the piston 25 in the region of the turning points.

Alternatively, instead of the two 3/2-port directional control valves 15, 15', a single 4/3-port directional control valve can be used. Compared with the combination of two individual valves, this has the drawback that idle times arise during switching. Therefore, the use of a single 4/3-port directional control valve is only a second best solution.

An actual pivot transducer 26, a nominal pivot angle transducer 27 and a nominal side wind equalizing transducer 28 are connected to the input side of the electrical control unit 17.

The output side of the electrical control device 17 comprises the control wires 16, 16', 22 leading to the valves 15, 15', 21. To process the input signals or to generate the control signals $w_{15}$, $w_{15}'$ for the valves 15, 15', 21, the electrical control device 17 comprises a microcontroller 29. The microcontroller continuously calculates the control signals $w_{15}$, $w_{15}'$ as a function of the input variables.

Figure 5:
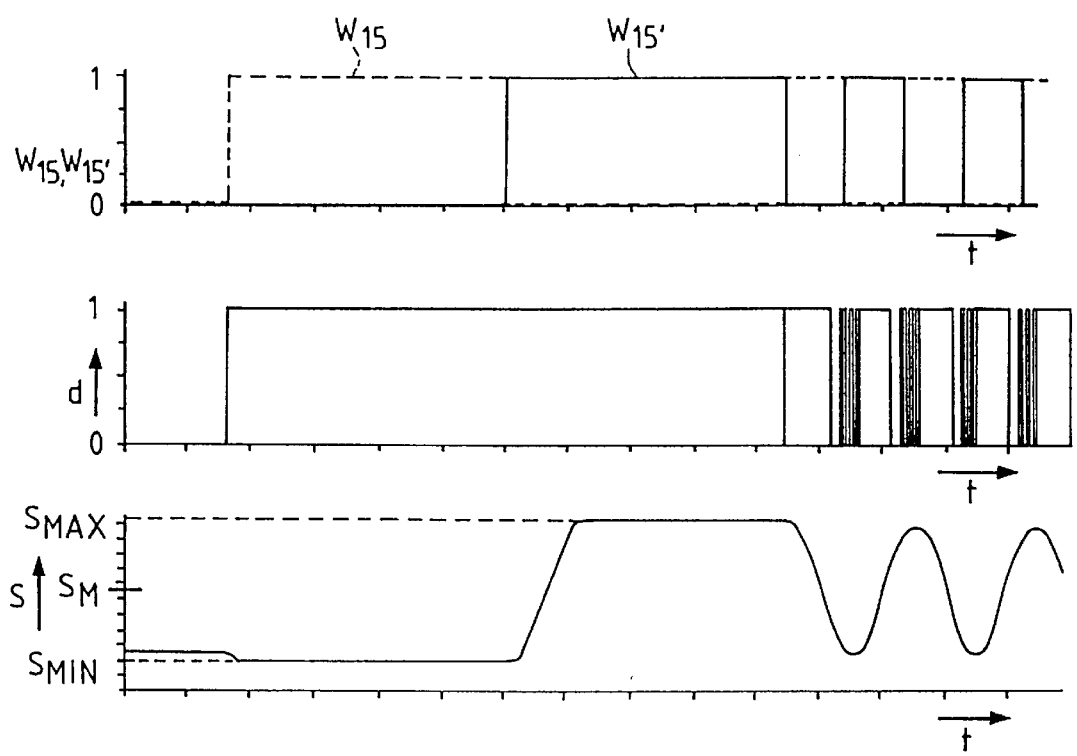
FIG. 5 is a time curve of the valve switching states and of the piston displacement during adjusting operation of the pivot unit.

As can be seen from FIG. 5, before commencement of pivot operation, there is an adjusting process within which the end stops of the piston 25, i.e. the maximum deflection $S_{MIN}$, $S_{MAX}$ of the piston 25, are approached in succession. Thereafter, the two stored end stop values may be averaged to determine the center position $s_M$ of the piston 25. If the predetermined maximum and minimum values $S_{MIN}$, $S_{MAX}$ are not reached, an error message is passed via CAN BUS to the on-board information system. At the same time, the valves 15, 15' are switched off until the next switch-on of the control system. This adjusting process makes it unnecessary to mechanically adjust the actual value transducer. Furthermore cable breaking or a valve defect can be detected by this means, thus ensuring functional monitoring.

After successfully completing the adjusting process, the control system can be changed to pivot operation. The valves are periodically driven as a function of a predetermined nominal pivot angle value 27 and, if the occasion arises, a nominal side wind equalizing value 28. The current turning point of the piston 25 is determined continuously by means of the actual value transducer 26 and compared with a predetermined nominal turning point, calculated from the nominal pivot angle value 27 and nominal side wind equalizing value 28. A new switch-off time $t_{Ab}$ is calculated as a function of the comparative value. This new switch-off time $t_{Ab}$ correspondingly switches off the pressure control valve 21, ensuring reliable smooth pivot movement, even in cases of disturbing influences. Thus, a learning system is provided, which reacts to any disturbing variables, such as fluctuating oil temperature, friction of the system or different valve switching times, and evens them out in the sense of a periodic pivot operation. In order to avoid the occurrence of overdrive, about ⅛ of the deviation between the nominal pivot angle value 27 and actual pivot angle transducer 26 is evened out in each pivot process by shifting of the switch-off time ($t_{Ab}$) in the microcontroller 29. Thus, in case of a sudden change in a state variable, the dynamic state changes to the static state in a controlled fashion.

Alternatively, directional control valves 15, 15' can be constructed as proportional directional control valves, possibly eliminating the need for the pressure control valve. Control to achieve a harmonic pivot operation could take place by coordinated direct driving of the directional control valves by means of the microcontroller 29.

As an alternative to the hydraulic control device described above, the apparatus according to the invention can also comprise a pneumatic control device. The nature of control depends on the application or on the quantity of the required switching times.

Other objects, advantages and features of the invention will be apparent to those skilled in the art and the invention should not be limited except as required by the scope of the appended claims.

We claim:

1. A method for ejecting a particulate material comprising the steps of: mounting an impeller blower for pivotal movement; reciprocating a fluid cylinder and causing the impeller blower to pivot back and forth; controlling the flow of fluid to the fluid cylinder during the pivot operation so there is a gradually increasing pressure on the fluid cylinder piston followed by a pressure drop before reversal of the fluid cylinder.

2. A method for ejecting material as set forth in claim 1, including the steps of: providing at least one directional control valve for controlling the flow of fluid to the fluid cylinder; and electrically controlling the control valve to gradually increase the fluid pressure followed by the pressure drop before reaching a time for switching the directional control valve.

3. A method according to claim 2, wherein said ejected material is a straw material.

4. A method according to claim 2, wherein switching of said directional control valve occurs at the valve switching time before reaching the turning switching time of the piston.

5. A method according to claim 2, wherein before switching of said directional control valve at the valve switching time, the step of switching off a pressure control valve in a switch-off time interval such that the fluid cylinder is not subjected to drive pressure.

6. A method according to claim 2, including the step of: subjecting said fluid cylinder to a drive pressure which increases linearly on average after switching of the directional control valve.

7. A method according to claim 5, wherein said pressure control valve is driven to reach a linear pressure increase by means of pulse width control after switching of the directional control valves.

8. An apparatus for ejecting a material including a pivot unit comprising an impeller blower having at least one ejection nozzle and a cooperating fluid cylinder which has a piston operatively connected to the impeller blower; a control unit comprising at least one directional control valve for control of the fluid cylinder, and so constructed and arranged that the ejection nozzle is pivoted reciprocally; the control unit comprising a pressure control valve and an electrical control device which acts on the pressure control valve and on the directional control valve in such a way that the piston of the fluid cylinder has a generally harmonic reciprocating movement.

9. An apparatus according to claim 8, wherein said control unit comprises a hydraulic adjusting device having a hydraulic cylinder as the fluid cylinder, a pressure source for providing a hydraulic fluid, a tank for collecting the fluid, wherein the pressure control valve is connected by a hydraulic pipe to the pressure source and to the tank for setting a predetermined drive pressure.

10. An apparatus according to claim 8, wherein said fluid cylinder is constructed as a double-acting fluid cylinder with a fluid connection arranged in the region of one end.

11. An apparatus according to claim 8, wherein said hydraulic adjusting device comprises two 3/2-port directional control valves which alternately switch an input and an output to and from the fluid cylinder respectively, during pivot operation.

12. An apparatus according to claim 8, wherein said control unit comprises an electrical control device, which is connected on the input side to an actual pivot angle transducer, a nominal pivot angle transducer and a nominal side wind equalizing transducer.

13. An apparatus according to claim 12, wherein said electrical control device continuously determines the turning switching times of the directional control valves during pivot operation by comparing the current turning points of the piston detected by means of the actual pivot angle transducer with the predetermined turning point.

14. An apparatus according to claim 12, wherein said electrical control device continuously determines switch-off times of the pressure control valve during pivot operation by comparing the current turning points of the piston detected by means of the actual pivot angle transducer with the predetermined turning point.

15. An apparatus according to claim 12, wherein said electrical control device comprises a means for calculating the predetermined turning point from the values of the nominal pivot angle transducer and the nominal side wind equalizing transducer.

16. An apparatus according to claim 8, wherein said electrical control device generates a periodic control signal for driving the pressure control valve.

17. An apparatus according to claim 16, wherein said pressure control valve exhibits a linear increase in a turning range of the piston.

18. An apparatus according to claim 16, wherein said electrical control device comprises a means for providing the control signal as a digital signal.

19. An apparatus according to claim 18, wherein said electrical control device comprises a means for providing a pulse width-controlled digital signal.

20. An apparatus according to claim 8, wherein said adjusting means are provided such that during an adjusting operation the maximum turning points of the piston are approached and detected.

21. An apparatus according to claim 20, wherein a mechanical center position of the piston is calculated from said detected turning values.

\* \* \* \* \*